United States Patent
Jang et al.

(10) Patent No.: US 11,555,885 B2
(45) Date of Patent: Jan. 17, 2023

(54) METHOD FOR TRANSMITTING MULTIBEAM STEERING JAMMING SIGNAL, AND TRANSMITTING SYSTEM FOR IMPLEMENTING METHOD

(71) Applicant: AGENCY FOR DEFENSE DEVELOPMENT, Daejeon (KR)

(72) Inventors: Yeon Soo Jang, Daejeon (KR); In Seon Kim, Daejeon (KR); Sang Won Kim, Daejeon (KR); Beom Jun Park, Daejeon (KR); Un Seob Jeong, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 116 days.

(21) Appl. No.: 16/966,434

(22) PCT Filed: Jul. 10, 2019

(86) PCT No.: PCT/KR2019/008464
§ 371 (c)(1),
(2) Date: Jul. 30, 2020

(87) PCT Pub. No.: WO2020/080646
PCT Pub. Date: Apr. 23, 2020

(65) Prior Publication Data
US 2021/0033701 A1    Feb. 4, 2021

(30) Foreign Application Priority Data
Oct. 17, 2018   (KR) .......................... 10-2018-0123924

(51) Int. Cl.
*G01S 7/38* (2006.01)
(52) U.S. Cl.
CPC ..................... *G01S 7/38* (2013.01)

(58) Field of Classification Search
CPC ...................................................... G01S 7/38
(Continued)

(56) References Cited

U.S. PATENT DOCUMENTS

| 3,879,732 A | * | 4/1975 | Simpson | G01S 7/38 342/14 |
| 4,467,328 A | * | 8/1984 | Hacker | G01S 7/38 342/14 |

(Continued)

FOREIGN PATENT DOCUMENTS

| KR | 10-0517954 | 10/2005 |
| KR | 10-0586705 | 6/2006 |
| KR | 10-1779385 | 9/2017 |

OTHER PUBLICATIONS

International Search Report for PCT/KR2019/008464 dated Oct. 18, 2019 and its English translation from WIPO (published as WO 2020/080646).

(Continued)

*Primary Examiner* — Erin F Heard
*Assistant Examiner* — Michael W Justice
(74) *Attorney, Agent, or Firm* — Ladas & Parry, LLP

(57) ABSTRACT

An embodiment of the present invention is a method of transmitting a multibeam jamming signal of an array antenna and including: a signal receiving operation of receiving a radar signal from a plurality of radars; a signal analysis operation of analyzing the received radar signal and identifying an angle and frequency of the signal; a control phase value calculating operation of calculating a control phase value of each array path of the array antenna for each of the identified angles; and a multibeam jamming signal transmission operation of calculating a multibeam jamming signal based on the calculated control phase value and transmitting the multibeam jamming signal for each identified frequency.

9 Claims, 6 Drawing Sheets

(58) Field of Classification Search
USPC .................................................. 342/13, 14
See application file for complete search history.

(56) References Cited

U.S. PATENT DOCUMENTS

| | | | | |
|---|---|---|---|---|
| 4,517,568 A * | 5/1985 | Willmore | .................. | G01S 7/38 342/14 |
| 7,362,257 B2 * | 4/2008 | Bruzzone | ............... | G01S 7/021 342/13 |
| 7,576,686 B2 * | 8/2009 | Needham | ............. | G01S 13/767 342/174 |
| 8,472,863 B2 * | 6/2013 | Sheby | ..................... | H04K 3/44 455/1 |
| 9,207,313 B2 * | 12/2015 | Schuman | ............. | H01Q 3/2605 |
| 9,798,001 B2 * | 10/2017 | Aizawa | .................... | G01S 3/74 |
| 9,825,360 B2 * | 11/2017 | Miller | ..................... | H01Q 3/24 |
| 10,686,487 B2 * | 6/2020 | Kirkpatrick | ............. | H01Q 3/36 |
| 10,754,020 B2 * | 8/2020 | Holt | ...................... | G01S 13/426 |
| 10,775,498 B2 * | 9/2020 | Vacanti | ............... | G01S 13/4472 |
| 11,143,756 B2 * | 10/2021 | Vacanti | ................ | G01S 13/933 |
| 2007/0192391 A1 * | 8/2007 | McEwan | ................. | G01S 7/285 708/271 |
| 2007/0296625 A1 * | 12/2007 | Bruzzone | ................. | G01S 7/36 342/13 |
| 2008/0284637 A1 * | 11/2008 | Blessing | ............... | G01S 13/933 342/30 |
| 2009/0109085 A1 * | 4/2009 | Needham | ............. | G01S 13/762 342/174 |
| 2010/0045506 A1 | 2/2010 | Law et al. | | |
| 2015/0130655 A1 * | 5/2015 | Aizawa | ................... | G01S 13/42 342/147 |
| 2015/0138992 A1 | 5/2015 | Jover | | |
| 2015/0323650 A1 * | 11/2015 | Schuman | ............... | H04K 3/228 342/17 |
| 2016/0211577 A1 * | 7/2016 | Miller | ...................... | H04K 3/00 |
| 2017/0016988 A1 | 1/2017 | Numata | | |
| 2017/0041038 A1 * | 2/2017 | Kirkpatrick | ............. | H04B 1/48 |
| 2018/0259641 A1 * | 9/2018 | Vacanti | ................. | G01S 13/953 |
| 2019/0064338 A1 * | 2/2019 | Holt | ....................... | H01Q 1/525 |
| 2020/0304166 A1 * | 9/2020 | Kirkpatrick | ............ | H01Q 3/247 |
| 2020/0341132 A1 * | 10/2020 | Holt | ........................ | G01S 7/411 |
| 2021/0132219 A1 * | 5/2021 | Vacanti | ..................... | G01S 7/35 |

OTHER PUBLICATIONS

Written Opinion of the International Searching Authority for PCT/KR2019/008464 dated Oct. 18, 2019 and its English machine translation by Google Translate (published as WO 2020/080646).
Shengyuan Li et al. "Adaptive detection with conic rejection to suppress deceptive jamming for frequency diverse MIMO radar", Digital Signal Processing. Jun. 19, 2017, vol. 69, pp. 32-40, Retrieved from URL: https://www.sciencedirect.com/science/article/pii/S1051200417301227.
Office Action for Korean Patent Application No. 10-2018-0123924 dated Jan. 30, 2020 and its English machine translation by Google Translate.

* cited by examiner

METHOD FOR TRANSMITTING MULTIBEAM STEERING JAMMING SIGNAL, AND TRANSMITTING SYSTEM FOR IMPLEMENTING METHOD

CROSS-REFERENCE TO RELATED APPLICATIONS

The present application is the U.S. National Phase of PCT Application No. PCT/KR2019/008464 filed on Jul. 10, 2019, which claims the priority to Korean Patent Application No. 10-2018-0123924 filed on Oct. 17, 2018, the entire contents of which are incorporated herein by reference.

TECHNICAL FIELD

The present invention relates to a method for transmitting a multibeam jamming signal and a transmission system for implementing the method, and more specifically, to a method for transmitting a multibeam jamming signal, which improves the structural problems of the time division beam steering jamming system, and a transmission system for implementing the method.

BACKGROUND ART

Electronic attack technology is an important technology that may protect friendly forces from enemy radar threats. These electronic attacks are generally known as jamming, and are applied to jet fighters and battleships. In general, because jamming systems must respond to multiple threat signals from various angles, when transmitting the jamming signal corresponding to each threat by dividing time, the jamming systems steer and radiate the beam.

FIG. 1 is a diagram showing an example of a conventional time division beam steering jamming system.

Referring to FIG. 1, it may be seen that the conventional time division beam steering jamming system according to FIG. 1 is a jamming system that steers beams using four array antennas. The jamming signal generated from the jamming signal source is up-converted to the frequency of the incident threat signal. At this time, the frequency generation unit generally selects the frequency of the threat signal from a number of local oscillators LOs.

The signal of which frequency is increased is branched to each array antenna, and depending on the angle of the threat signal, a phase shift amount corresponding to each phase shifter is applied and transmitted through each array antenna. The threat objects that transmit the threat signals receive the jamming signal of a maximum size from the angle at which the threat objects are located. According to the existing time division beam steering jamming system, there is a limitation that only one frequency and one beam steering may be set at the same time.

The array antenna is designed in that a single antenna is insufficient when it is necessary to sharpen a beam pattern more than a conventional parabolic antenna. In particular, if the array antenna is arranged in a two-dimensional matrix rather than a single line, the beam steering may be controlled more precisely in three dimensions, and a strong beam pattern that spreads further away by combining the radiated power of each antenna may be generated.

In order to sharpen the beam pattern despite the limitation that only one beam steering setting is possible, a beam steering jamming system including a conventional array antenna has to include a switching configuration that selects one of the frequencies of the threat signals from a plurality of local oscillators.

In FIG. 1, the number of array antennas is limited to 4 for convenience of explanation, but depending on the embodiment, the number of array antennas constituting the beam steering jamming system may be less or more than four. In addition, for convenience of description, the amplifier and filter generally applied to the RF circuit in FIG. 1 are omitted.

FIG. 2 shows a diagram of temporal characteristics of a time division beam steering jamming signal generated by the time division beam steering jamming system described in FIG. 1.

Referring to FIG. 2, when using the time division beam steering jamming system as shown in FIG. 1, it may be seen that jamming signal outputs for four threat targets of different frequencies located at different angles appear at different times. That is, as shown in FIG. 2, because the conventional time division beam steering jamming system steers and outputs a single frequency jamming signal at the same time, as the number of threatened targets increases, there is a problem in that the simultaneous response power is significantly reduced.

DESCRIPTION OF EMBODIMENTS

Technical Problem

The technical object to be solved by the present invention is to provide a multibeam jamming signal transmission system that does not significantly reduce the simultaneous response power when the threat objects increase and various threat signals of various frequencies are incident at random angles and a method for transmitting a jamming signal implemented through the system.

Solution to Problem

A method according to an embodiment of the present invention for solving the above technical problem is a method of transmitting a multibeam jamming signal of an array antenna, and includes: a signal receiving operation of receiving a radar signal from a plurality of radars; a signal analysis operation of analyzing the received radar signal and identifying an angle and frequency of the signal; a control phase value calculating operation of calculating a control phase value of each array path of the array antenna for each of the identified angles; and a multibeam jamming signal transmission operation of calculating a multibeam jamming signal based on the calculated control phase value and transmitting the multibeam jamming signal for each identified frequency.

A system according to another embodiment of the present invention for solving the above technical problem is a multibeam jamming signal transmission system of an array antenna, and includes: a signal reception unit configured to receive a radar signal from a plurality of radars; a signal analysis unit configured to analyze the received radar signal and identify an angle and frequency of the signal; a control phase value calculation unit configured to calculate a control phase value of each array path of the array antenna for each of the identified angles; and a multibeam jamming signal transmission unit configured to calculate a multibeam jamming signal based on the calculated control phase value and transmit the multibeam jamming signal for each identified frequency.

One embodiment of the present invention may provide a computer-readable recording medium storing a program for implementing the method.

Advantageous Effects of Disclosure

According to the present invention, even if multiple threat targets are present in a complex manner, and thus threat signals of various angles of various frequencies are received, the target signals are simultaneously responded, and thus, the survivability of allied fighters and battleships may be maximized.

BEST MODE

Figure 1:
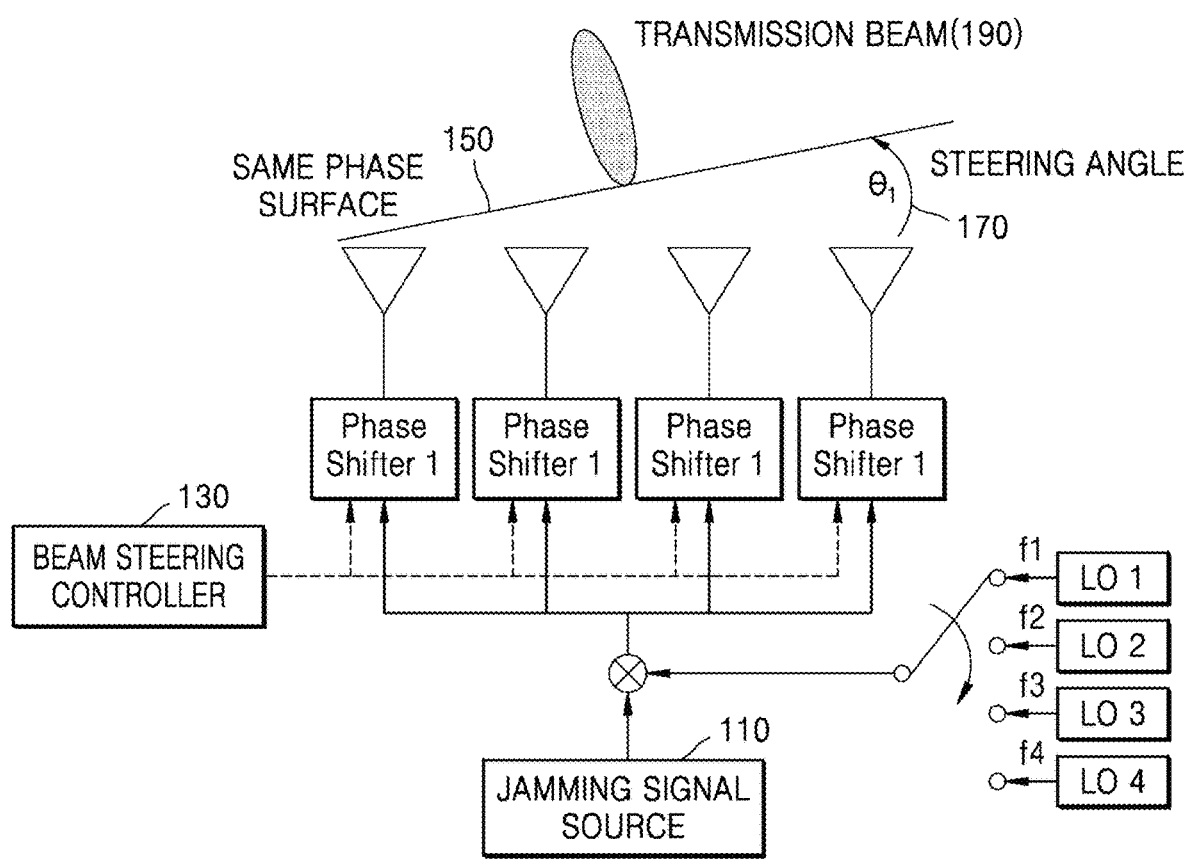
FIG. 1 is a diagram showing an example of a conventional time division beam steering jamming system.

A method according to an embodiment of the present invention for solving the above technical problem is a method of transmitting a multibeam jamming signal of an array antenna, and includes: a signal receiving operation of receiving a radar signal from a plurality of radars; a signal analysis operation of analyzing the received radar signal and identifying an angle and frequency of the signal; a control phase value calculating operation of calculating a control phase value of each array path of the array antenna for each of the identified angles; and a multibeam jamming signal transmission operation of calculating a multibeam jamming signal based on the calculated control phase value and transmitting the multibeam jamming signal for each identified frequency.

In the above method, the control phase value calculating operation may be characterized in that the control phase value is calculated considering an arrangement interval between a plurality of antennas constituting the array antenna.

In the above method, the control phase value calculating operation may be characterized in that the control phase value is calculated considering the wavelength of the received radar signal.

In the above method, the control phase value calculating operation may be characterized in that the control phase value is calculated considering an arrangement interval between a plurality of antennas constituting the array antenna and a wavelength of the received radar signal.

A system according to another embodiment of the present invention for solving the above technical problem is a multibeam jamming signal transmission system of an array antenna, and includes: a signal reception unit configured to receive a radar signal from a plurality of radars; a signal analysis unit configured to analyze the received radar signal and identify an angle and frequency of the signal; a control phase value calculation unit configured to calculate a control phase value of each array path of the array antenna for each of the identified angles; and a multibeam jamming signal transmission unit configured to calculate a multibeam jamming signal based on the calculated control phase value and transmit the multibeam jamming signal for each identified frequency.

In the system, the control phase value calculation unit may be characterized in that the control phase value is calculated considering an arrangement interval between a plurality of antennas constituting the array antenna.

In the system, the control phase value calculation unit may be characterized in that the control phase value is calculated considering the wavelength of the received radar signal.

In the system, the control phase value calculation unit may be characterized in that the control phase value is calculated considering an arrangement interval between a plurality of antennas constituting the array antenna and a wavelength of the received radar signal.

One embodiment of the present invention may provide a computer-readable recording medium storing a program for implementing the method.

MODE OF DISCLOSURE

Various modifications are possible in various embodiments of the present invention and specific embodiments are illustrated in drawings and related detailed descriptions are listed. Effects and features of the present invention, and methods for achieving them will be clarified with reference to embodiments described below in detail together with the drawings. However, the present invention is not limited to the embodiments disclosed below, but may be implemented in various forms.

Hereinafter, embodiments of the present invention will be described in detail with reference to the accompanying drawings, and when describing with reference to the drawings, the same or corresponding components are given the same reference numerals and redundant description thereof will be omitted.

In the following embodiments, terms such as 'first' and 'second' are not used in a limited sense, but for the purpose of distinguishing one component from other components.

In the following embodiments, the singular expression includes a plural expression unless the context clearly indicates otherwise.

In the following embodiments, the term "including" or "having" means that a feature, or element, described in the specification is present, but does not preclude the possibility that one or more other features or components may be added.

When an embodiment may be implemented differently, a specific process order may be performed differently from the described order. For example, two processes described in succession may be performed substantially simultaneously, or may be performed in an order opposite to that described.

Hereinafter, embodiments of the present invention will be described in detail with reference to the drawings.

Figure 3:
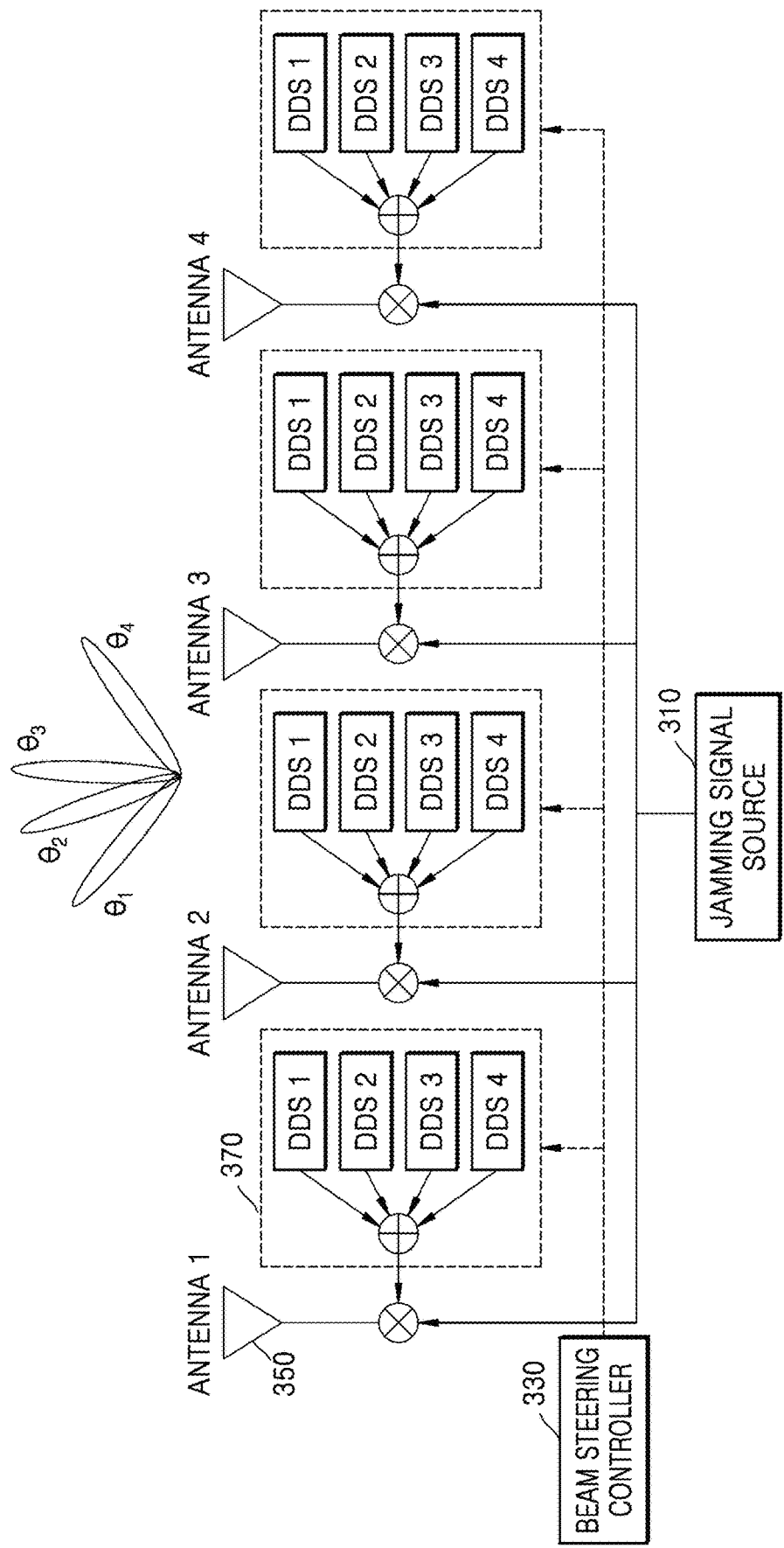
FIG. 3 is a diagram schematically showing an example of a multibeam jamming signal transmission system according to the present invention.

FIG. 3 is a diagram schematically showing an example of a multibeam jamming signal transmission system according to the present invention.

The multibeam jamming signal transmission system according to FIG. 3 includes a jamming signal source 310, a beam steering controller 330, an array antenna 350, and a frequency generation unit 370. For convenience of explanation, in the multibeam jamming signal transmission system of FIG. 3, the number of array antennas is only 4, but according to the embodiment, the number of array antennas may be less or more than 4.

The jamming signal source 310 transmits jamming signals to four array antennas constituting a multibeam jamming signal transmission system. The transmitted jamming signal is up-converted to the frequency received from the frequency generation unit 370 described later.

The beam steering controller 330 transmits phase control information according to the antenna sequence numbers to four array antennas. For example, it is assumed that a threat signal 1 has a frequency $f_1$ at an angle $\theta_1$, a threat signal 2 has a frequency $f_2$ at an angle $\theta_2$, a threat signal 3 has a frequency $f_3$ at an angle $\theta_3$, and a threat signal 4 has a frequency $f_4$ at an angle $\theta_4$. Here, the threat signal refers to a signal that is emitted from a threat target and received with a certain angle and frequency by a multibeam jamming signal transmission system, and the threat target refers to an enemy antenna of which specific performance is unknown.

In order to transmit a jamming signal corresponding to a threat signal, the array antenna 350 is an antenna arranged in a multibeam jamming signal transmission system and has a total of four antennas in FIG. 3. For convenience of description, the array antenna 350 below is regarded as referring to an antenna 1 of FIG. 3, and antennas 2 to 4 also perform the same function as the antenna 1. The array antenna 350 transmits the multibeam jamming signal converted and calculated by the frequency received from the frequency generation unit 370 to each threat target that transmits the threat signal at each frequency in response to the jamming signal received from the jamming signal source 310.

The frequency generation unit 370 includes a miniaturized Direct Digital Synthesizer (DDS) capable of performing precise phase control, and then each DDS receives the phase control information according to the antenna sequence number from the beam steering controller 330, and the received phase control information is transmitted, such that the multibeam jamming signal for the array path of the array antenna 350 may be calculated from the baseband jamming signal transmitted from the jamming signal source 310.

According to the multibeam jamming signal transmission system according to the present invention, by applying a frequency generation unit capable of performing phase control to each array antenna, beam steering control information is set in parallel, thereby enabling beam steering for multiple frequencies simultaneously, such that unlike the conventional time division beam steering jamming system, the multibeam jamming signal transmission system may easily cope with multiple threats. Depending on the embodiment, it will be apparent to those skilled in the art that a frequency oscillator or a signal generator capable of performing phase control as well as DDS may be used.

Figure 4:
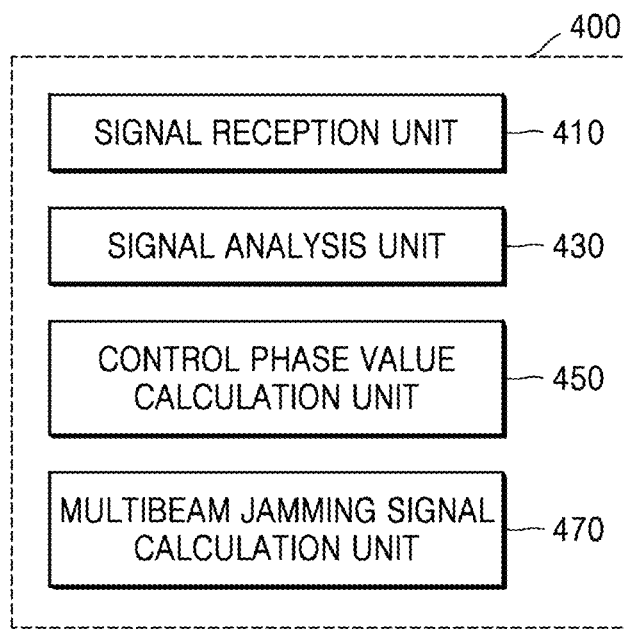
FIG. 4 is a block diagram of another example of a multibeam jamming signal transmission system according to the present invention.

FIG. 4 is a block diagram of another example of a multibeam jamming signal transmission system according to the present invention.

Referring to FIG. 4, it may be seen that a multibeam jamming signal transmission system 400 according to the present invention includes a signal reception unit 410, a signal analysis unit 430, a control phase value calculation unit 450, and a multibeam jamming signal calculation unit 470. The multibeam jamming signal transmission system 400 according to the present invention shown in FIG. 4 is another example of the multibeam jamming signal transmission system described with respect to FIG. 3, and physically or logically includes the jamming signal source, the beam steering controller, the array antenna, and the frequency generation unit included in the multibeam jamming signal transmission system of FIG. 3, as well as an amplifier and a filter omitted in FIG. 3.

The signal reception unit 410, the signal analysis unit 430, the control phase value calculation unit 450, and the multibeam jamming signal calculation unit 470 according to an embodiment of the present invention correspond to at least one processor, or include at least one processor. Accordingly, the signal reception unit 410, the signal analysis unit 430, the control phase value calculation unit 450, and the multibeam jamming signal calculation unit 470 may be driven in a form included in other hardware devices such as a microprocessor or general purpose computer system.

First, the signal reception unit 410 receives radar signals from a plurality of radars. The object that emits the radar signal received by the signal reception unit 410 is considered to be the same as the threat object described with respect to FIG. 3 as at least two or more radars.

The signal analysis unit 430 analyzes the radar signal received by the signal reception unit 410 to identify the angle and frequency of the signal.

The control phase value calculation unit 450 calculates the control phase value of each array path of the array antenna for each angle identified by the signal analysis unit 430. If the signal reception unit 410 has received radar signals from five radars, the control phase value of each array path calculated by the control phase value calculation unit 450 may also be a total of five sets. The control phase value calculation unit 450 collectively performs the functions of the beam steering controller 330 and the frequency generation unit 370 in FIG. 3. The phase characteristic of the baseband jamming signal transmitted from the jamming signal source is changed by the control phase value calculated by the control phase value calculation unit 450 so that the direction of the beam may be adjusted in various ways.

As an optional embodiment, the control phase value calculation unit 450 may calculate a control phase value considering an arrangement interval between a plurality of antennas constituting an array antenna. The arrangement interval between the antennas constituting the array antenna is a beam pattern generated by the array antenna and plays a decisive role in changing the shape of the main lobe and side lobes.

As another optional embodiment, the control phase value calculation unit 450 may calculate the control phase considering the wavelength of the radar signal.

As another optional embodiment other than the described-above optional embodiments, the control phase value calculation unit 450 may calculate the control phase value considering both the arrangement interval between the plurality of antennas constituting the array antenna and the wavelength of the radar signal. In order to illustrate this optional embodiment, as shown in FIG. 3, threat signals 1 to 4 are transmitted from four threat targets, and it is assumed that the threat signal 1 has the frequency $f_1$ at the angle $\theta_1$, the threat signal 2 has the frequency $f_2$ at the angle $\theta_2$, the threat signal 3 has the frequency $f_3$ at the angle $\theta_3$, and the threat signal 4 has the frequency $f_4$ at the angle $\theta_4$.

$$p_{11} = \Delta p_1 = \frac{2\pi * d * \sin\theta_1}{\lambda_1} \quad \text{[Equation 1]}$$

$$p_{12} = 2 * \Delta p_1 = 2 * \frac{2\pi * d * \sin\theta_1}{\lambda_1} \quad \text{[Equation 2]}$$

$$p_{13} = 3 * \Delta p_1 = 3 * \frac{2\pi * d * \sin\theta_1}{\lambda_1} \quad \text{[Equation 3]}$$

$$p_{14} = 4 * \Delta p_1 = 4 * \frac{2\pi * d * \sin\theta_1}{\lambda_1} \quad \text{[Equation 4]}$$

$$p_{41} = \Delta p_4 = \frac{2\pi * d * \sin\theta_4}{\lambda_4} \quad \text{[Equation 5]}$$

$$p_{42} = 2 * \Delta p_4 = 2 * \frac{2\pi * d * \sin\theta_4}{\lambda_4} \quad \text{[Equation 6]}$$

$$p_{43} = 3 * \Delta p_4 = 3 * \frac{2\pi * d * \sin\theta_4}{\lambda_4} \quad \text{[Equation 7]}$$

$$p_{44} = 4 * \Delta p_4 = 4 * \frac{2\pi * d * \sin\theta_4}{\lambda_4} \quad \text{[Equation 8]}$$

Equations 1 to 4 mean the equations used by the control phase value calculation unit 450 to calculate the control phase value of each array path for $\theta_1$, and Equations 5 to 8 represent the equations used by the control phase value calculation unit 450 to calculate the control phase value of each array path for $\theta_4$. In Equations 1 to 4, d is an arrangement interval between array antennas, and $\lambda_1$ is a wavelength of the threat signal 1. In Equations 5 to 8, d is an arrangement interval between array antennas, and $\lambda_4$ is a wavelength of the threat signal 4. It will be apparent to those skilled in the art that the control phase values of each array path for 82 and 83 may be calculated by analogy applying Equations 1 to 8.

In addition, Equations 1 to 8 are equations considering that the number of array antennas is four and thus four array paths are formed, and if the number of antennas constituting the array antenna increases and the number of array paths increases, the control phase value may be calculated from equations different from Equations 1 to 8 or a larger number of equations than Equations 1 to 8.

The multibeam jamming signal calculation unit 470 calculates a multibeam jamming signal based on the control phase value calculated by the control phase value calculation unit 450, and transmits a multibeam jamming signal for each threat frequency identified by the signal analysis unit 430.

$$J(t) = S(t)\sum_{i=1}^{N}\sum_{k=1}^{N} \exp[j(2\pi f_i t + k\Delta p_i)] \quad \text{[Equation 9]}$$

Equation 9 means that the multibeam jamming signal calculation unit 470 calculates the multibeam jamming signal. In Equation 9, J(t) means the output function of the multibeam jamming signal, S(t) means the output function of the baseband jamming signal outputted from the jamming signal source 310 of FIG. 3, and N means the number of threat objects (type of threat signal) received from the signal reception unit 410.

Figure 5:
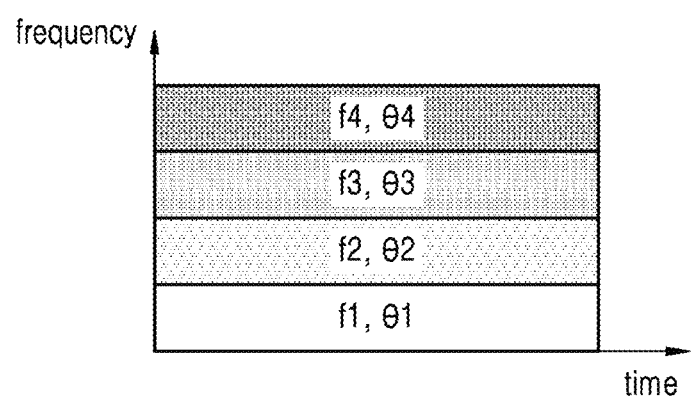
FIG. 5 is a diagram schematically showing the frequency domain and time domain characteristics of a multibeam jamming signal outputted by the system according to the present invention.

FIG. 5 is a diagram schematically showing the frequency domain and time domain characteristics of a multibeam jamming signal outputted by the system according to the present invention.

Figure 2:
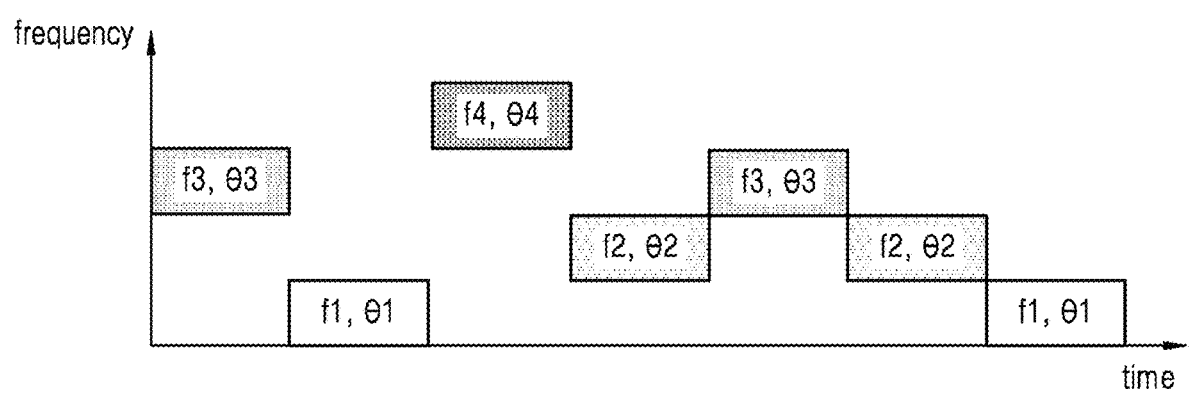
FIG. 2 shows a diagram of temporal characteristics of a time division beam steering jamming signal generated by the time division beam steering jamming system described with respect to FIG. 1.

Comparing FIG. 5 to FIG. 2, unlike conventional time division beam steering jamming signal, the multibeam jamming signal outputted by the system according to the present invention includes beam-steered jamming signals for each threat frequency in all time domains so that it may be intuitively understood that even if the types of threat targets increase, the ability to respond simultaneously to multiple threats does not deteriorate.

According to the multibeam jamming signal system according to the present invention, as a frequency generator such as a DDS capable of performing individual phase control is applied to each of a plurality of array antennas constituting the system and the beam steering control information is set in parallel, according to the calculated multibeam jamming signal, unlike the conventional time division beam steering jamming signal system, a high simultaneous response to multiple threats may be secured. According to the present invention, even if threat signals of various frequencies are transmitted from various angles, jamming signals for all threat signals may be transmitted in parallel without delay.

Figure 6:
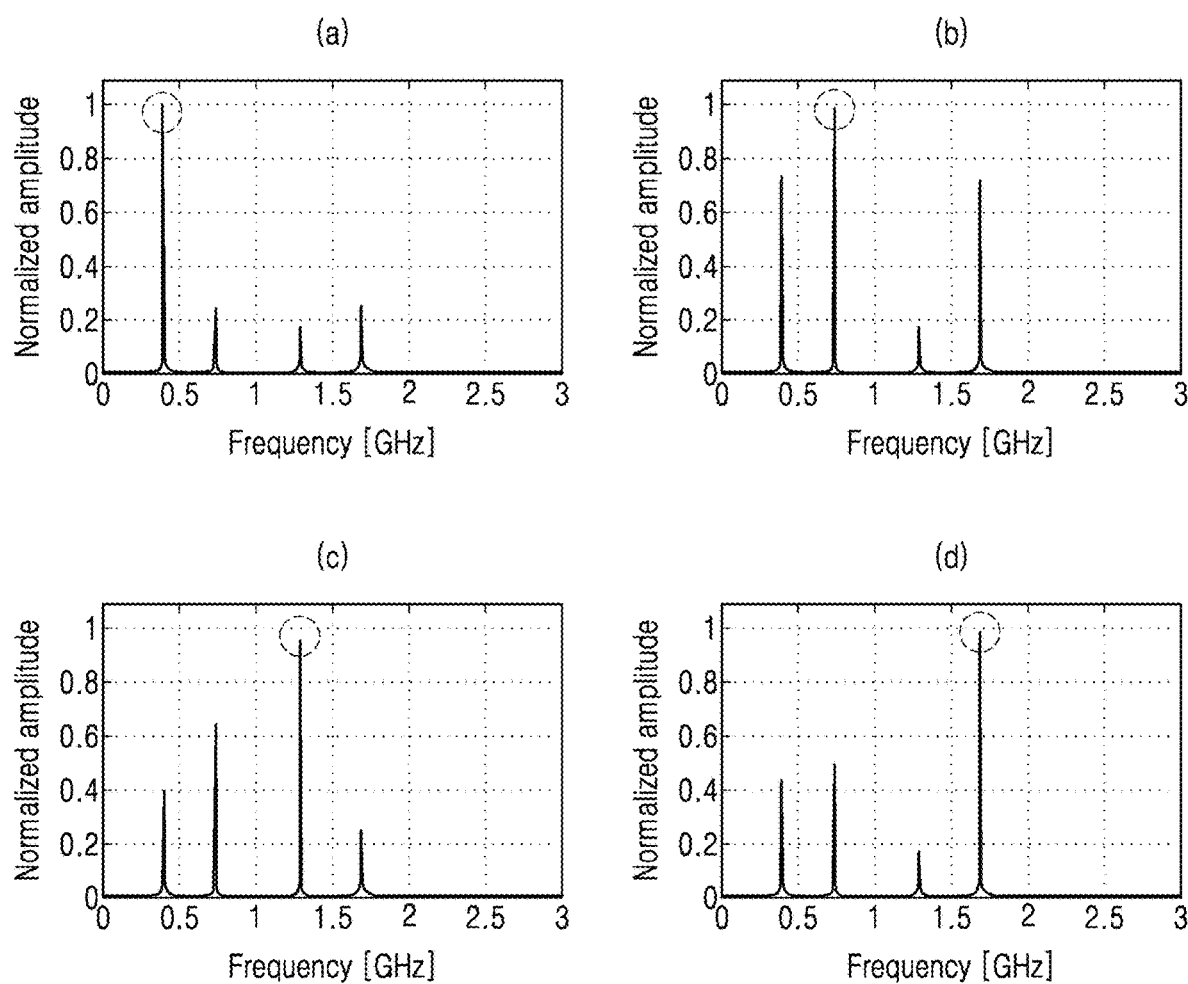
FIG. 6 is a diagram for explaining that the simultaneous response force may be secured by the multibeam jamming signal calculated by a system according to the present invention.

FIG. 6 is a diagram for explaining that the simultaneous response force may be secured by the multibeam jamming signal calculated by a system according to the present invention.

In FIG. 6, it is assumed that respectively threat signals, in which threat the target 1 has a frequency of 0.4 GHz and an angle of −30 degrees, the threat target 2 has a frequency of 0.75 GHz and an angle of −11 degrees, the threat target 3 has a frequency of 1.3 GHz and an angle 0 degrees, and the threat target 4 has a frequency of 1.7 GHz and an angle of 25 degrees, are transmitted. Hereinafter, the frequency of the threat signal is referred to as a threat frequency and the angle of the threat signal is referred to as a threat angle.

In FIG. 6, the multibeam jamming signal system 400 according to the present invention generates a general tone-type jamming signal, and applies phase control for beam steering according to the frequency up and threat angle corresponding to each threat frequency, thereby generating a simultaneous multiple beam steering jamming signal according to Equation 9. Then, the multibeam jamming signal system 400 according to the present invention normalizes the amplitude of the threat signal received at each threat angle and analyzes the normalized amplitude in the frequency domain.

Referring to FIG. 6, frequency components corresponding to each threat are strongly received so that it may be confirmed that jamming signals for multiple threats are effectively applied at the same time. More specifically, the frequency components of 0.4 GHz in FIG. 6(*a*), 0.75 GHz in FIG. 6(*b*), 1.3 GHz in FIG. 6(*c*), and 1.7 GHz in FIG. 6(*d*) are strongly received, and thus, it may be confirmed that jamming signals for multiple threats are effectively applied at the same time.

Thus, according to the present invention, as the simultaneous response to multiple threats that cannot be implemented in the existing time division system is secured, it may be established a widespread radio disturbance system to protect a large number of allies, as well as self-protection of allied jet fighters and battleships in a wartime situation.

Figure 7:
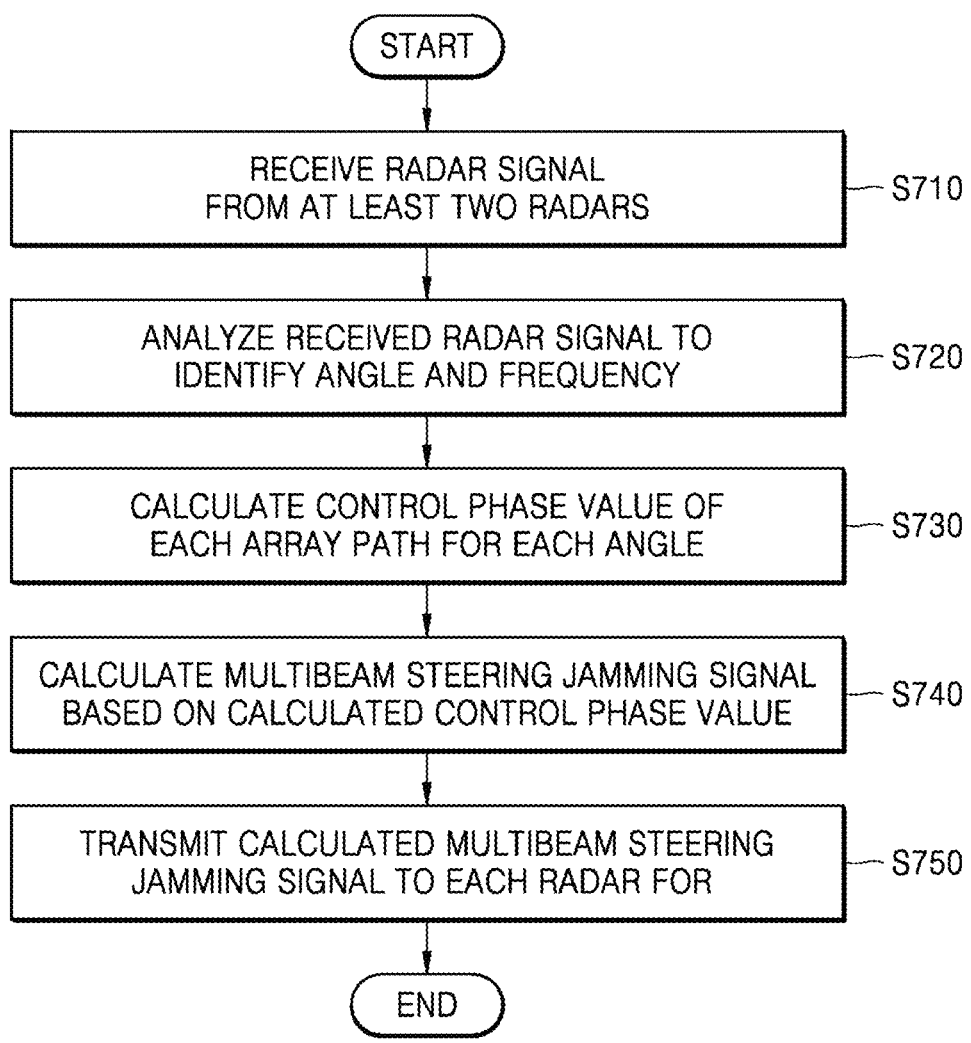
FIG. 7 is a flowchart illustrating an example of a method of transmitting a multibeam jamming signal according to the present invention.

FIG. 7 is a flowchart illustrating an example of a method of transmitting a multibeam jamming signal according to the present invention.

The method according to FIG. 7 may be implemented by the system according to FIG. 3 or 4, and will be described below with reference to FIGS. 3 and 4, and for convenience of description, descriptions previously given with reference to FIGS. 3 and 4 will be omitted.

The signal reception unit 410 receives radar signals from at least two radars (S710).

The signal analysis unit 430 analyzes the received radar signal to identify the angle and frequency (S720).

The control phase value calculation unit 450 calculates a control phase value of each array path for each array antenna for each angle (S730).

The multibeam jamming signal calculation unit 470 calculates a multibeam jamming signal based on the control phase value calculated in operation S730 (S740) and transmits the calculated multibeam jamming signal to each radar for each frequency identified in operation S720 (S750).

Embodiments according to the present invention described above may be implemented in the form of a computer program that may be executed through various components on a computer, and such a computer program may be recorded on a computer-readable recording medium. At this time, the computer-readable recording medium may include a hardware device specifically configured to store and execute program instructions, for example, magnetic media such as hard disks, floppy disks, and magnetic tape, optical recording media such as CD-ROMs and DVDs, magneto-optical media such as floptical disks, and ROM, RAM, flash memory, and the like.

Moreover, the computer program may be specially designed and configured for the present invention, or may be known and available to those skilled in the computer software field. An example of the computer program may include high-level language code executable by a computer using an interpreter in addition to machine code created by a compiler.

The specific implementations described in the present invention are exemplary embodiments, and do not limit the scope of the present invention in any way. For the brief specification, descriptions of conventional electronic configurations, control systems, software, and other functional aspects of the systems may be omitted. In addition, the connection or connection members of the lines between the components shown in the drawings are illustrative examples of functional connections and/or physical or circuit connections, and may be represented as an alternative or additional various functional connections, physical connections, or circuit connections in actual devices. In addition, unless specifically mentioned, such as "essential", "importantly", etc., it may not be a necessary component for application of the present invention.

In the specification (particularly in the claims) of the present invention, the use of the term "above" and the like indicating term may be used in the singular and the plural. In addition, when ranges are described in this invention, inventions applied with individual values within the above ranges (if not stated otherwise) are included, and the individual values constituting the range are the same as those in the detailed description of the invention. Finally, unless there is a clear or contradictory description of the steps constituting the method according to the invention, the steps may be done in a suitable order. The present invention is not necessarily limited to the description order of the above steps. The use of all examples or exemplary terms (e.g., etc.) in the present invention is merely to describe the present invention in detail, and unless limited by the claims, the scope of the present invention is not limited by the above examples or exemplary terms. In addition, those skilled in the art may understand that various modifications, combinations, and changes may be configured according to design conditions and factors within the scope of the appended claims or equivalents thereof.

INDUSTRIAL APPLICABILITY

The present invention may be applied to an industry that produces a signal receiver or RADAR that receives and analyzes various signals.

The invention claimed is:

1. A method of transmitting a multibeam jamming signal of an array antenna, the method comprising:
   a signal receiving operation of receiving radar signals from a plurality of radars;
   a signal analysis operation of analyzing the received radar signals and identifying an at least one angle and at least one frequency of the received radar signals;
   a control phase value calculating operation of calculating a control phase value for each array path of the array antenna for each of the at least one identified angles; and
   a jamming signal source operation of generating and transmitting a plurality of jamming signals to each array path in order to generate and transmit the multibeam jamming signal for each identified frequency,
   wherein:
   the array antenna consists of a plurality of antennas, and a plurality of direct digital synthesizers (DDSs) wherein each of the DDSs are arranged for each antenna constituting the array antenna wherein each of the DDSs is configured to apply individual phase control to each of the plurality of antennas of the array according to an antenna sequence respectively, based on the calculated control phase value.

2. The method of claim 1, wherein the control phase value calculating operation calculates the control phase value for each array path considering an arrangement interval between the plurality of antennas constituting the array antenna.

3. The method of claim 1, wherein the control phase value calculating operation calculates the control phase value for each array path considering a wavelength for each of the received radar signals.

4. The method of claim 1, wherein the control phase value calculating operation calculates the control phase value for each array path considering an arrangement interval between the plurality of antennas constituting the array antenna and a wavelength for each of the received radar signals.

5. A non-transitory computer-readable recording medium storing a program for executing the method according to claim 1.

6. A multibeam jamming signal transmission system of an array antenna, the system comprising:
   a signal reception unit including at least one antenna, and configured to receive radar signals from a plurality of radars;
   a signal analysis unit including at least one processor, and configured to analyze the received radar signals and identify at least one angle and at least one frequency of the received radar signals;
   a control phase value calculation unit including at least one processor, and configured to calculate a control phase value for each array path of the array antenna for each of the identified angles; and
   a jamming signal source configured to generate and transmit a plurality jamming signals to each array path in order to generate and transmit the multibeam jamming signal for each identified frequency,
   wherein:

the array antenna consists of a plurality of antennas, and
a plurality of direct digital synthesizers (DDSs) wherein each of the DDS s are arranged for each antenna constituting the array antenna wherein each of the DDSs is configured to apply individual phase control to each of the plurality of antennas of the array according to an antenna sequence respectively, based on the calculated control phase value.

7. The system of claim 6, wherein the control phase value calculation unit calculates the control phase value for each array path considering an arrangement interval between the plurality of antennas constituting the array antenna.

8. The system of claim 6, wherein the control phase value calculation unit calculates the control phase value for each array path considering a wavelength for each of the received radar signals.

9. The system of claim 6, wherein the control phase value calculation unit calculates the control phase value for each array path considering an arrangement interval between the plurality of antennas constituting the array antenna and a wavelength for each of the received radar signals.

* * * * *